M. H. LANG.
TRACTION ENGINE.
APPLICATION FILED JAN. 28, 1916.
1,259,878.
Patented Mar. 19, 1918.
3 SHEETS—SHEET 1.
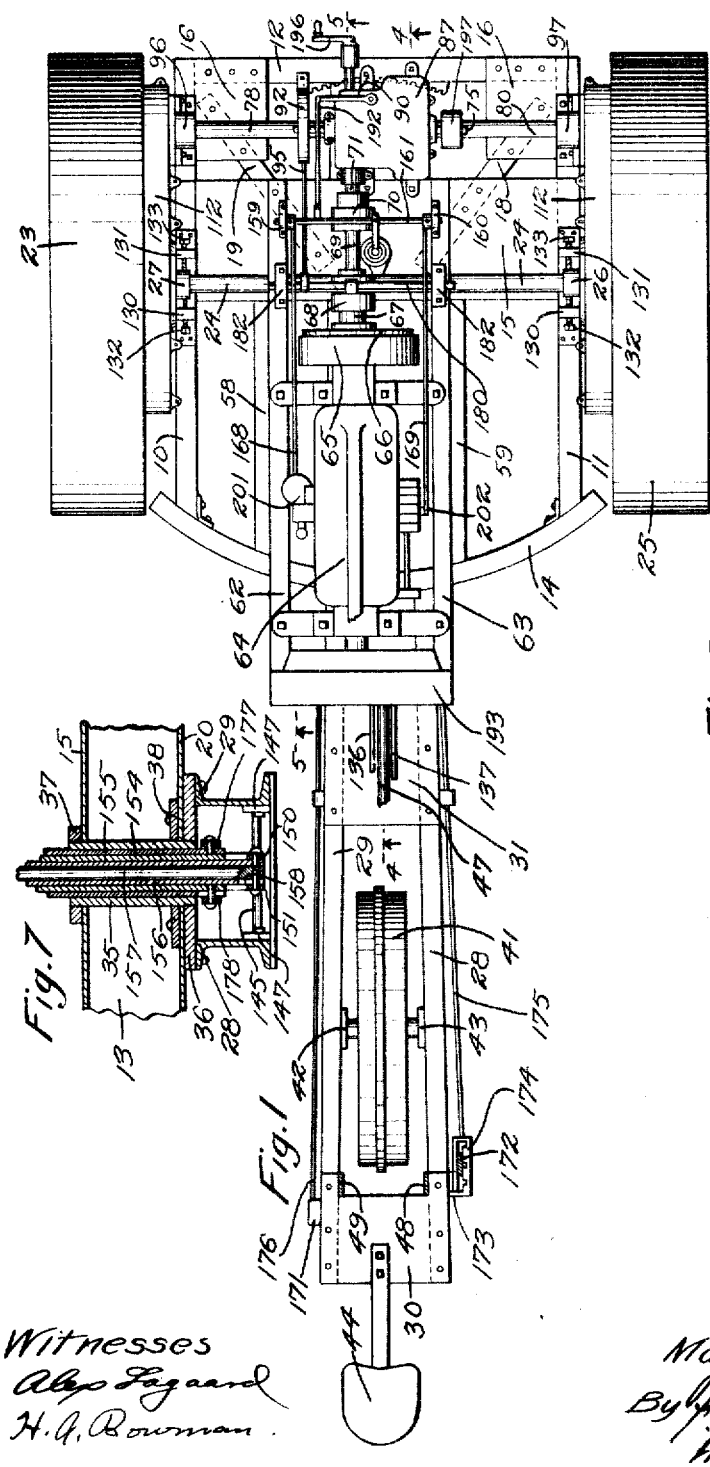
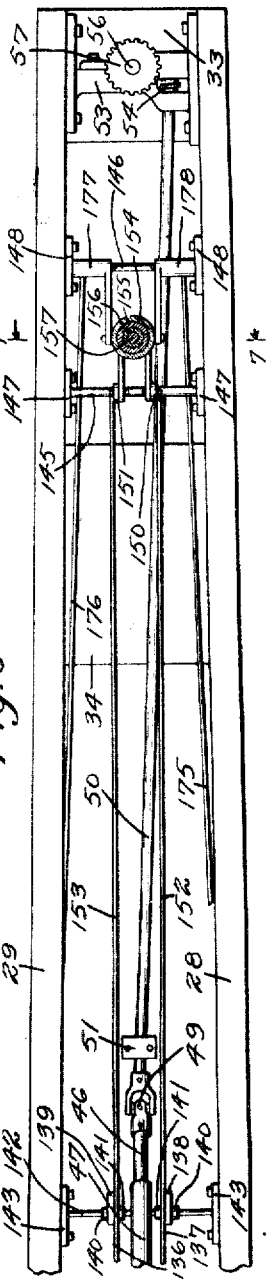
Witnesses
Alex Fagaard
H. G. Bowman
Inventor:
Martin H. Lang
By F. A. Whiteley
his Attorney

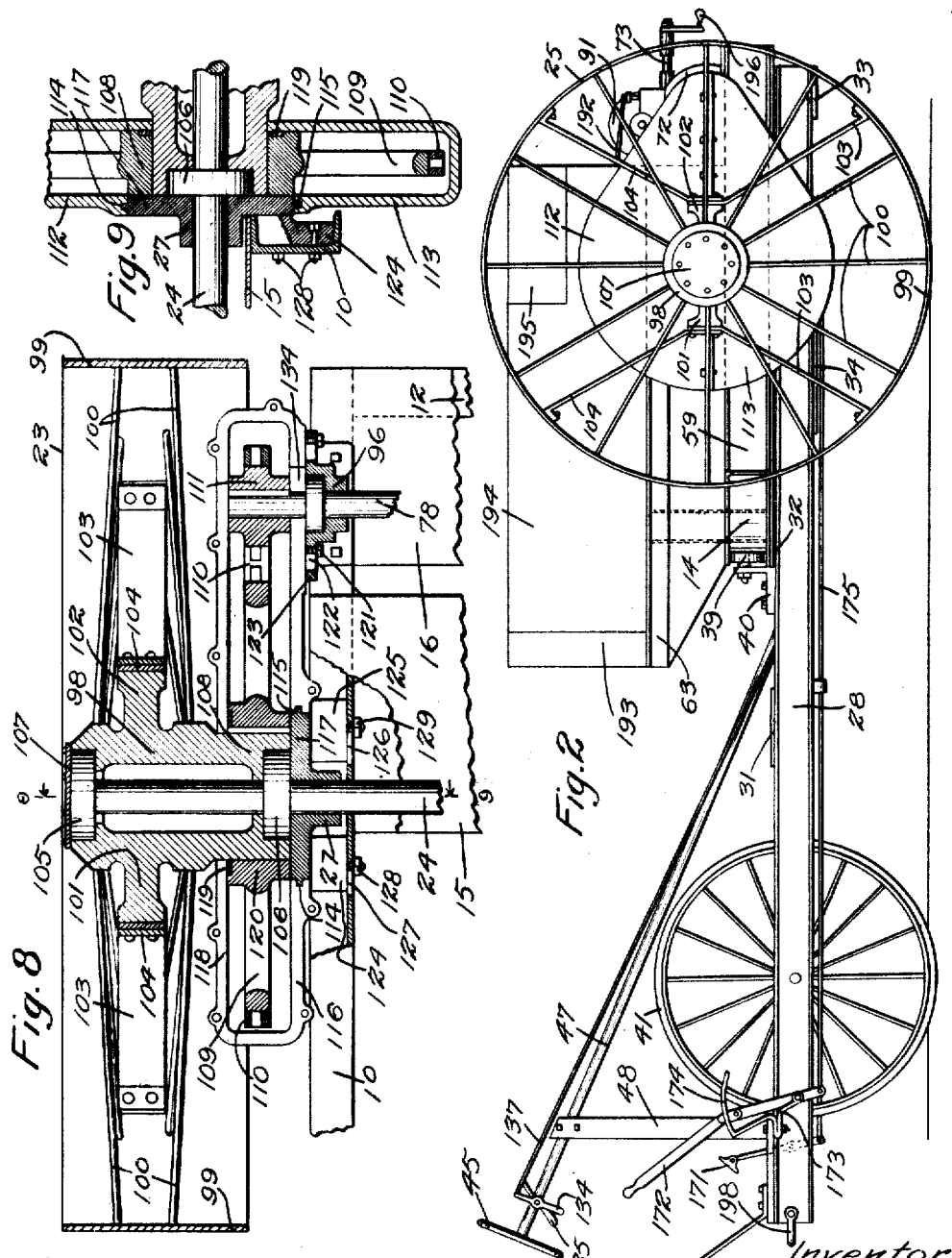

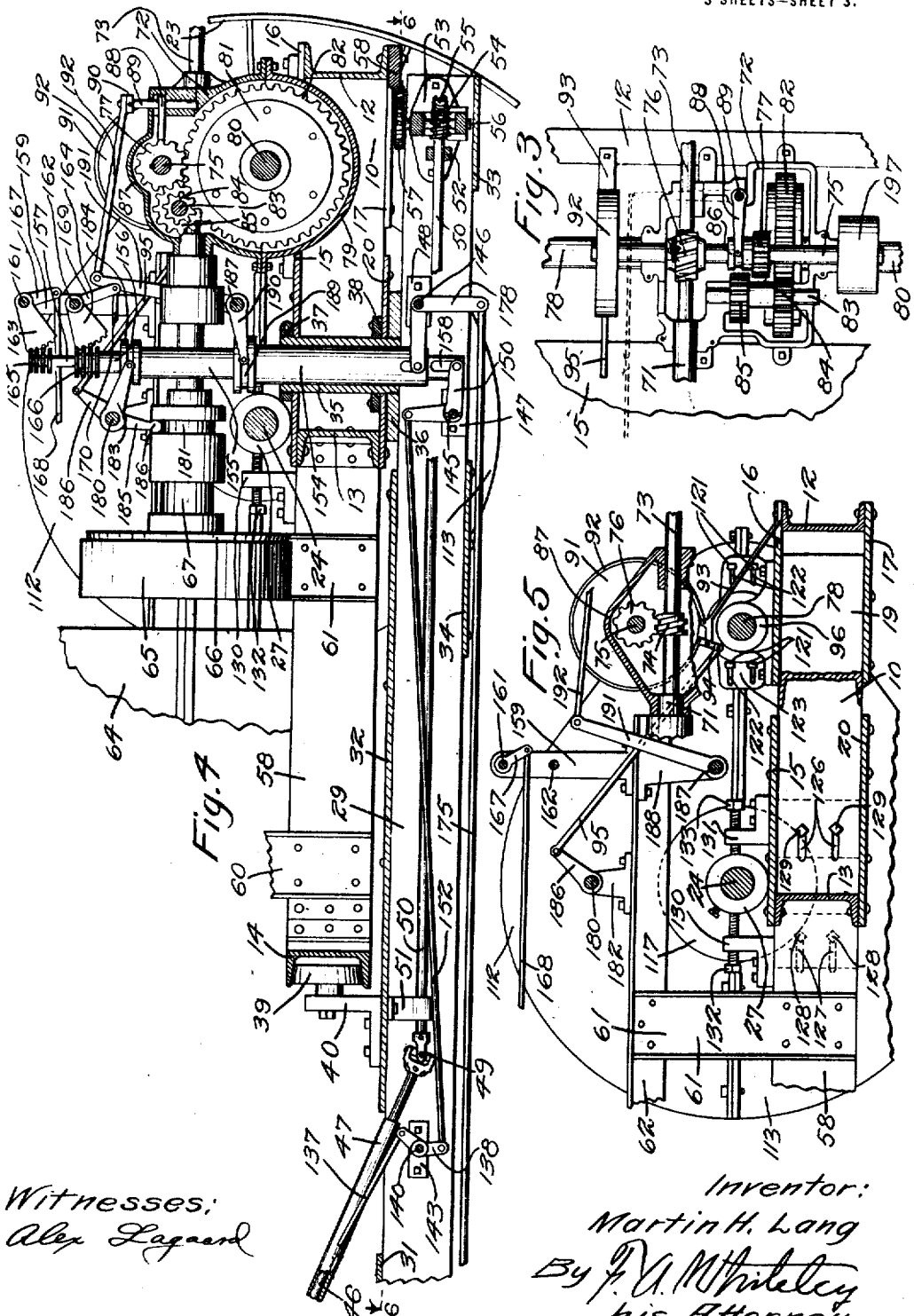

UNITED STATES PATENT OFFICE.

MARTIN H. LANG, OF MINNEAPOLIS, MINNESOTA.

TRACTION-ENGINE.

1,259,878.

Specification of Letters Patent.

Patented Mar. 19, 1918.

Application filed January 28, 1916. Serial No. 74,761.

*To all whom it may concern:*

Be it known that I, MARTIN H. LANG, a citizen of the United States, residing at Minneapolis, in the county of Hennepin and State of Minnesota, have invented certain new and useful Improvements in Traction-Engines, of which the following is a specification.

My invention relates to traction engines and has for its object to provide a traction engine having a frame supported by two traction wheels and provided with an explosive engine and transmission elements for operating said traction wheels, in combination with a drawbar frame pivotally connected at one end to the first-named frame and supported at the other end by a trailer wheel. The pivotal connection of the drawbar frame comprises a tubular member through which extend a series of sleeves which are adapted to oscillate about vertical axes and to slide in said tubular member, said sleeves individually operating means for controlling the motor and transmission elements; and it is an object of my invention to provide an operator's seat upon the end of the drawbar frame and mount control members upon said drawbar frame which through coöperation with said sleeves may actuate the engine and transmission controlling devices. My invention comprises simple and efficient means for relating the two frames and moving the same relatively to steer the traction engine and for assembling, protecting and covering the various parts on the first-named frame to render said parts in the highest degree efficient and to make them readily accessible, while at the same time they are kept free from dirt.

The full objects and advantages of my invention will appear in connection with the detailed description thereof and are particularly pointed out in the claims.

In the drawings, illustrating the application of my invention in one form,—

Figure 1 is a plan view of my improved tractor with the hood and several other parts removed. Fig. 2 is a side elevational view of the tractor complete. The remaining figures are all enlarged details of the parts of the tractor shown in Figs. 1 and 2, of which Fig. 3 is a plan view of the front portion of the tractor with the upper portion of the transmission gear case removed. Fig. 4 is an elevational sectional view taken on line 4—4 of Fig. 1. Fig. 5 is a view similar to Fig. 4 taken on line 5—5 of Fig. 1. Fig. 6 is a plan sectional view of the drawbar frame with parts removed taken on line 6—6 of Fig. 4. Fig. 7 is a cross sectional view of the drawbar frame taken on line 7—7 of Fig. 6. Fig. 8 is a plan sectional view of one of the driving wheels and the driving mechanism taken along the axes of the same. Fig. 9 is an elevational sectional view of the drive sprocket case taken on line 9—9 of Fig. 8.

The main frame or driving wheel frame, which is incidentally the steering wheel frame, is preferably constructed of structural steel held together by plates and angles riveted thereto in the usual manner. Two longitudinal members 10 and 11 of channel section are connected with a front transverse member 12, a central transverse member 13 and a curved rear transverse member 14 by means of a plate 15 extending across the whole frame on the top and a similar member 20 on the bottom, and by plates 16 and 17 located at the front corners. This frame is braced by means of two diagonal channel members 18 and 19 attached to the plates 16 and 17 and the plates 15 and 20. The main frame is supported on two driving wheels 23 and 25 journaled upon a stationary axle 24 attached to said frame by a pair of castings 26 and 27 bolted thereon. The drawbar frame, which is best shown in Figs. 4 and 6, comprises two longitudinal channel members 28 and 29 closely spaced and secured together by a number of transverse plates 30, 31, 32, 33 and 34 distributed upon the top and bottom thereof. This frame has secured to it near the front a tubular king bolt 35, best shown in Fig. 4, which is screwed into and passes through a heavy plate 36 riveted to the upper portions of the drawbar frame members 28 and 29. The drawbar is pivoted to the under portion of the main frame by this bolt which passes through the plates 15 and 20 exactly half way between the two wheels 23 and 24 and an amount in advance of the axle 24 just sufficient to allow the parts passing therethrough to clear said axle. A lock nut 37 is screwed upon the upper portion of king bolt 35 and serves to hold the drawbar frame in place beneath the main frame. Plate 20 is reinforced at the place where the king bolt passes through it by a small supplemental plate 38 riveted to it, which also serves to present a larger bearing surface for said king bolt. The main frame is further connected with the drawbar frame through member 14 of the main frame which is curved in the arc of a circle whose center lies in the axis of the king bolt. This member has its flanges turned outward and is adapted to serve as a track for a beveled roller 39 pivotally mounted on a casting 40 secured to the drawbar frame. This roller runs between the flanges of said member and substantially extends from one flange to the other so that the main frame is practically deprived of vertical motion relative to the drawbar frame but permits the main frame to be oscillated for steering purposes. Between the drawbar frame members 28 and 29 at the rear of the same is mounted a trailing wheel 41 which is journaled in blocks 42 and 43 secured to these members and which serves to support the rear portion of this frame.

Upon the rear plate 30 attached to the drawbar frame is positioned a driver's seat 44 in proper relation to which is situated a steering wheel 45. Wheel 45 is attached to a long shaft 46 which is journaled throughout the greater portion of its length in a tube 47. A stand, comprising members 48 and 49, which are secured to the frame members 28 and 29, supports the tube 47 at its upper end, as best shown in Figs. 1 and 2. The lower end of tube 47 floats and is supported through the steering rod 46 which terminates in a universal joint 49 coupling said shaft with a shaft 50 positioned between the frame members 28 and 29. A hanger 51 bolted to the underside of plate 32 serves as a journal for shaft 50 adjacent the universal joint 49. Shaft 50 extends up to the front of the drawbar frame and is there journaled in a bearing 52, a part of a casting 53 extending between the frame members 28 and 29 at their foremost end. A worm gear 54 is secured to shaft 50 and meshes with a worm wheel 55 fast on a vertically-positioned shaft 56 journaled in the casting 53. Shaft 56 also carries a pinion 57 which meshes with an internal gear segment 58 secured to the channel member 12 of the main frame. Rotation of the hand wheel 45 hence causes the main frame to be oscillated relative to the drawbar frame and effects steering of the tractor.

The location of the engine is best shown in Figs. 1 and 4. An auxiliary frame attached to the main frame is used to support it. Two longitudinal channel members 58 and 59 are secured to the plates 15 and 20 and to the curved rear member 14 in the plane of the main frame. Pairs of uprights 60 and 61 are secured to the frame members 58 and 59 and carry two angle beams 62 and 63 parallel to said frame members, but raised above them. A vertical cylinder engine 64 is mounted upon the beams 62 and 63 somewhat toward the rear of the frame which extends back over the curved frame member 14. The engine is provided, as usual, with a fly wheel 65 in which is located a friction clutch 66 mounted on a sleeve 67 riding upon the crank shaft of the engine. A universal joint 68, attached to sleeve 67, couples the clutch member with a short shaft 69 which is again connected through a universal joint 70 with a propeller shaft 71. It will be noted in Fig. 1 that the engine and supporting frame are slightly offset to the right of the tractor to enable the shaft 69 to clear the operating mechanism which passes upward through the king bolt. The transmission case is, however, positioned on the opposite side of the tractor, as will be presently explained, and so tends to equalize the heft upon the two driving wheels.

The transmission system of my improved tractor is mounted in a casing 72 attached to the plate 15 and the transverse channel 12, as best shown in Figs. 3, 4 and 5. Shaft 71 previously referred to is journaled in this case and has a portion 73 reduced in diameter, which passes directly through it out beyond the front of the tractor. As best seen in Fig. 5, a worm gear 74 is secured upon the shaft section 73 and drives a short countershaft 75 journaled in case 72 through a worm wheel 76 fast thereon. A pair of differential drive shafts 78 and 80 are also journaled in the casing 72 directly under shaft 75 and parallel to it. These shafts extend across the whole tractor frame and drive the wheels in a manner to be later explained. A differential 81, having a spur ring gear 82, couples the shafts 78 and 80 together and is completely inclosed within the casing 72 by a cover 79 which is bolted to the underside of said casing. A stub shaft 83 journaled in case 72 carries a pinion 84 fast thereon meshing with gear 82 and also a pinion 85 of larger diameter spaced therefrom. A pinion 77 integral with a shifting sleeve 86 is splined to shaft 75 and is adapted to mesh with either the gear 82 or the pinion 85 to give forward or reverse direction of travel of the tractor. A cover 87 bolted to case 72 incloses the gears mounted on the shafts 75, 83 and 73 and also permits of removing of said shafts. Pinion 77 is shifted through a forked lever 88 attached to a vertically-positioned rod 89 journaled in the cover 87. An arm 90 is secured upon the uppermost end of the rod 89 which passes through the cover 87 and serves to operate the gear shifting device.

In Figs. 3 and 5 is shown the braking mechanism. A brake drum 91 is secured to one end of the shaft 75 extending out through the case 72. A band 92 encompasses brake drum 91 and is secured at one end to a support 93 fastened to the frame member 12, carrying a lever 94. Lever 94 is pivoted at its center to the support 93 and is connected at one end to the brake band 92 and at its other end to an actuating rod 95 in the usual manner.

The means for driving the wheels from the differential shafts are shown in Figs. 1, 5, 8 and 9. Shafts 78 and 80 besides being journaled in the transmission gear case 72 are journaled in boxes 96 and 97 securely bolted upon the longitudinal frame members 10 and 11 through the plates 16. Driving means are provided from each of these shafts to the corresponding wheels, which means are identical in construction and need only be described in one instance. As best seen in Fig. 8, wheel 23 comprises a central hub 98 which is secured to the rim 99 by spokes 100. The torque driving the wheel is transmitted through this hub and to withstand the strain a pair of arms 101 and 102 are cast integral with said hub and are securely bound to rim 99 by means of bars 103 and 104 riveted thereto, as shown in Figs. 8 and 2. Hub 98 is journaled to rotate upon the end of the axle in roller bearings 105 and 106 and is covered at the end by a cover plate 107. A portion 108 of this hub extends up to the casting 27 and serves to hold a large sprocket wheel 109 which is keyed thereon. A chain 110 passes over said sprocket wheel and over a smaller sprocket wheel 111 which is keyed to the extreme end of shaft 78. Both of these sprockets are incased by an upper sprocket case 112 and a lower sprocket case 113 bolted together. A groove 114 in the inner wall 116 of both case members fits over a corresponding tongue 115 in a flange-like portion 117 integral with the casting 27. The whole case is practically supported at this one point and a dust-tight joint is effected. The opposite wall 118 of the cases rides loosely upon the portion 108 of the hub and a dust-proof joint is procured by means of a felt washer 119 embedded in the side of the sprocket wheel hub 120, which washer bears against the inner surface of said wall. The forward portion of the gear case is bolted to the bearing 96 by means of cap screws 121 which pass through slots 122 in ears 123 on said bearing and are screwed into the wall 116 of said case.

Adjustment of the chain tension can be had without the removal of the sprocket cases. The flange portions 117 of the axle supporting members 26 and 27, as best shown in Figs. 8 and 9, are provided with a pair of blocks 124 and 125 which occupy the space between the flanges of the channel sections 10 and 11. These channels are provided with slotted holes 126 and 127 through which bolts 128 and 129 pass to secure said blocks thereto. Upon the upper surface of frame members 10 and 11 are rigidly secured brackets 130 and 131 which have setscrews 132 and 133 adapted to engage the supporting castings 26 and 27, as best shown in Figs. 1 and 5. When the bolts 128 and 129 and the cap screws 121 are loosened the wheel axle 24 may be longitudinally adjusted to give any desired chain tension, the sprocket cases being moved along with it. It will be noted in Fig. 8 that the shaft 78 passes through a slot 134 in the sprocket case and that the chain in the position shown would be as slack as possible. When the bolts 128 and 129 and the cap screws 121 are tightened the castings 26 and 27 are firmly secured to the frame and the sprocket cases secured to the bearings 96 and 97.

As before stated, the motion of the controlling levers is transmitted through the king bolt of the tractor so that the same results are obtained whether the drive wheel frame is in alinement with the drawbar frame or angularly disposed relative thereto for the purpose of steering. The engine controlling mechanism is arranged to operate the spark-turning device and the carbureter throttle, as is customary with most engines. As seen in Fig. 2, two hand levers 134 and 135 are pivoted to the steering rod bearing 47 on opposite sides thereof and in close proximity to the steering wheel 45. These levers are connected to long rods 136 and 137 which slant downward in the same direction as the steering rod, and which, as best shown in Fig. 4, are pivoted to the upper arms of bell-cranks 138 and 139 rotatably mounted between collars 140 and 141 fast on shaft 142 secured between the drawbar frame members 28 and 29 in castings 143. In proximity of the king bolt 35 is situated a shaft 145 on the rear side thereof, similar to shaft 142, which shaft is secured between the drawbar frame members in similar castings 147. A pair of right angled bell-cranks 150 and 151 are mounted upon shaft 145 and are held in place between pins 149 on said shafts and are connected with the bell-cranks 138 and 139 by links 152 and 153. Within king bolt 35 are slidably positioned a plurality of sleeves 154, 155 and 156 and a rod 157 each within the other and slidable relative to the other. Each of these sleeves communicates with one or the other of the controlling levers in a manner clearly illustrated in Figs. 4, 6 and 7. Bell-crank 151 has an arm pivoted to sleeve 156 and bell-crank 150 has an arm pivoted to the rod 157, which pivot passes through a slot 158 in sleeve 156. This arrangement allows the bell-cranks 150 and 151 to oscillate on the same axis and yet gives them the same and a maximum length of stroke. The pivots used in these bell-cranks are fast thereon but are loosely positioned in the sleeve members so that all lateral motion, due to the oscillation, is taken up in the play. Movement of levers 134 and 135 hence causes rod 157 and sleeve 156 to be independently raised and lowered. The portion of the operating devices so far described are inherent to the drawbar frame and remain stationary relative thereto when the steering frame or main frame is oscillated.

Another portion of the controlling device is attached to and oscillates with the main frame. This is best shown in Figs. 1, 4 and 5. The angle beams 62 and 63, previously referred to as supporting the engine, also support this element of the device. A pair of standards 159 and 160 are secured upon the front portions of the angle beams 62 and 63 and serve as bearings for a pair of transverse shafts 161 and 162 situated one below the other. Fast on shafts 161 and 162 are gear segments 163 and 164 which mesh with racks 165 and 166 formed on the upper ends of the rod 157 and sleeve 156, respectively. The teeth of these racks pass circumferentially about the center of the king bolt as an axis and hence always remain in mesh with their corresponding gear segments. Shaft 161 has at one end an arm 167 to which is pivotally connected a link 168 communicating with the throttle of the carbureter 201 in the usual manner. Shaft 162 similarly has attached to it an arm 169 to which is pivotally secured a link 170 communicating with the spark-turning device 202 of the engine in the usual manner. It will now be comprehended that movement of the hand levers 135 and 136 operates the means for controlling the engine and that said operation is positive and independent of the position of the steering wheel frame relative to the drawbar frame.

For driving the tractor a foot lever 171 is employed which controls both the clutch and the brake, and a hand lever 172 is provided which shifts the gears. Lever 171 is pivoted to the side of the drawbar frame member 29 to be engaged by the left foot. Lever 172 is mounted in a bracket 173 attached to the upper flange of drawbar frame member 28, which bracket terminates in a segment 174 adapted to hold the lever 172 in three distinct positions in the usual manner. Both of the levers 171 and 172 extend below the drawbar frame and are connected by long links 175 and 176 to corresponding arms of a pair of bell-cranks 177 and 178 rotatably mounted upon a shaft 146 held in place between the drawbar frame members by castings 148. Bell-cranks 177 and 178 are arranged to raise and lower sleeves 154 and 155. respectively, similar to the engine-controlling mechanism.

The device for effecting the throwing in and out of the clutch and for setting the brakes from the vertical motion of the sleeves within the king bolt can best be seen in Figs. 4 and 5. A shaft 180 is positioned a short distance above a shifting collar 181 attached to the clutch sleeve 67 and is journaled in standards 182 bolted to the angle beams 62 and 63. A shifting collar 184 is provided at the upper end of sleeve 155 and operates a yoked arm 183 fast on the shaft 180. An arm 185 also fast on shaft 180 has a ball-shaped end 186 which is adapted to throw the clutch in and out through the shifting collar 181. Another arm 186 is also secured to shaft 180 and connects with the brake setting rod 95. Movement of the foot lever 171 causes the corresponding sleeve 155 to be raised, which first throws the clutch out and then sets the brake.

Shifting of gears is produced as follows: A shaft 187 is journaled in hangers 188 attached to the angle beams 62 and 63 and is operated from a shifting collar 189 attached to the upper end of sleeve 156, said collar engaging a forked arm 190 fast on said shaft. At the farther end of shaft 187 is situated a long arm 191 which is connected by a link 192 to the arm 90 of the gear shifting device. Oscillation of the hand lever 172 thus shifts the pinion 77 on the shaft 75 to give a forward or a reversed direction of travel of the tractor.

Both the engine and the central operating mechanism are inclosed. A radiator 193, as seen in Fig. 2, rests upon the rear end of the angle beams 62 and 63. A hood 194 covers the engine and extends back up to the transmission gear case. A compartment 195 immediately over the central operating mechanism serves as a fuel reservoir. All of the undersides and spaces between the frame members are covered, so that the engine is absolutely free from dirt. In starting the engine a hand crank 196 attached to the shaft 73 may be manipulated in the usual manner. This it will be noted is out in front of the tractor, where there is plenty of room. A pulley 197 secured upon a protruding end of shaft 75 may be used for obtaining power for stationary purposes.

As before stated, the rear wheel frame of the tractor serves as a drawbar. An eye 198 secured thereto serves as a coupling and all of the tractive effort is transmitted through said frame.

The advantages of my invention are manifest. The weight of the tractor rests substantially upon the front driving wheels and in traveling forward the rear portion is thrown toward the ground instead of away from it, so that the full benefit of the power of the engine may be used without upsetting the equilibrium. The steering wheel and operating levers are arranged in the usual way so a person accustomed to driving an automobile would be capable of driving my tractor. By removing the hood all of the operating parts are exposed to view and repairs or adjustments can easily be made. With the arrangement as shown and described it becomes evident that the driver can see past the hood on both sides to view the ground ahead of him, thus giving him full view on all sides of him.

I claim:

1. A traction engine comprising a frame, a pair of traction wheels supporting said frame, engine and transmission elements on the frame, and a drawbar pivotally connected with the frame at a point forward of the transverse axis of the traction wheels.

2. A traction engine comprising a frame, an axle secured transversely on said frame and extending across the same, a pair of wheels mounted on said axle for supporting the frame, engine and transmission elements on the frame, a drawbar pivoted to said frame and extending under and below said axle, said pivot comprising a king bolt extending upward in front of said axle, means associated with said king bolt for controlling the engine and transmission elements, and a seat and operating levers on said drawbar for operating said controlling means.

3. A traction engine comprising a frame, an axle positioned transversely on said frame, a pair of traction wheels mounted on said axle and supporting said frame, a king bolt vertically positioned near said axle, a drawbar frame pivoted on said king bolt, and engine and transmission elements on said main frame including a transmission shaft extending longitudinally of said frame in close proximity to said king bolt and axle.

4. A traction engine comprising a frame, a pair of traction wheels supporting said frame, a king bolt connected to said frame midway between said wheels, an engine secured to said frame rearward of the king bolt having a shaft positioned to one side of said king bolt and extending past the same, and a transmission device positioned ahead of said king bolt on the opposite side thereof to counterbalance the weight of said engine.

5. A traction engine comprising an axle and a pair of traction wheels, a frame hung from said axle and of a sufficient width to occupy the space between said wheels, a countershaft and transmission elements secured to the forward end of said frame for driving said traction wheels, an auxiliary frame of lesser width secured to said first-named frame and positioned above the same at the rear thereof, and an engine mounted on said auxiliary frame having a longitudinal shaft extending over and past said axle and operating said transmission to drive the tractor.

6. A traction engine comprising a frame, a pair of traction wheels supporting said frame, engine and transmission elements on the frame for driving the traction wheels, a tubular king bolt, a drawbar frame rigidly connected with said king bolt, an operator's seat on said drawbar frame, and means controlled by the operator from said seat and operative through said king bolt for controlling the operation of said engine and transmission elements.

7. A traction engine comprising a frame, a pair of traction wheels supporting said frame, engine and transmission elements on the frame for driving the traction wheels, a tubular king bolt, a drawbar frame rigidly connected with said king bolt, an operator's seat on said drawbar frame, a plurality of sleeves journaled in said king bolt, means controlled by said sleeves for operating the engine and transmission elements, and means controlled by the operator from said seat for operating said sleeves.

8. A traction engine comprising a frame, a pair of traction wheels supporting said frame, engine and transmission elements on the frame for driving the traction wheels, a tubular king bolt, a drawbar frame rigidly connected with said king bolt, an operator's seat on said drawbar frame, a plurality of sleeves journaled in said king bolt and vertically slidable, means operated by sliding of said sleeves for operating the engine and transmission elements, and means controlled by the operator from said seat for sliding the sleeves.

9. A traction engine comprising a frame, a pair of traction wheels supporting said frame, engine and transmission elements on said frame, a drawbar pivotally connected to said frame substantially below the axis of said wheels and extending longitudinally in both directions from said pivot, means at one end of said frame for oscillating said drawbar relative to said frame, and means at the other end of said frame for guiding and restricting the movements of said frame and drawbar to a horizontal plane.

10. A traction engine comprising a frame, a pair of traction wheels supporting said frame, engine and transmission elements on the frame for driving the traction wheels, a tubular king bolt journaled for vertical oscillating movement on said frame in front of the transverse axis of the traction wheels, a drawbar rigidly connected with said king bolt, and means extending through the king bolt for controlling the operation of the engine and transmission elements.

11. A traction engine comprising a frame, a pair of traction wheels supporting said frame, engine and transmission elements on the frame for driving the traction wheels, a tubular king bolt journaled for vertical oscillating movement on said frame in front of the transverse axis of the traction wheels, a drawbar rigidly connected with said king bolt, means extending through the king bolt for controlling the operation of the engine and transmission elements, and means for oscillating the drawbar and engine frame relatively about said king bolt for steering the traction engine.

12. A traction engine comprising a frame, a pair of traction wheels supporting said frame, a drawbar frame pivotally connected with the first-named frame and having a portion extended forwardly to near the front of said first-named frame, an operator's seat upon the drawbar frame, and means controlled from said operator's seat and operative from the drawbar frame upon the forward portion of said first-named frame for oscillating the two frames relatively to steer the traction engine.

13. A traction engine comprising a frame, a pair of traction wheels supporting said frame, a drawbar frame pivotally connected with said first-named frame so that a portion of said drawbar frame extends forward of said pivot to a point adjacent the forward portion of the first-named frame, a rack on the first-named frame curved in an arc having its center in the center of pivotal connection of the two frames, a gear on the drawbar frame meshing with said rack, an operator's seat at the rear of the drawbar frame, and means controlled by the operator from said seat for actuating said gear to oscillate the two frames relatively and steer the traction engine.

14. A traction engine comprising a frame, a pair of traction wheels supporting said frame, engine and transmission elements on the frame for driving the traction wheels, a drawbar frame extending below the first-named frame, a tubular king bolt fast on the drawbar frame and extending below the same and into a socket on the first-named frame for pivotally connecting said frames to oscillate relatively about a vertical axis, an operator's seat on the rear end of said drawbar frame, means extending through said king bolt for operating the engine and transmission elements, and means mounted upon and extending along said drawbar frame to the seat of the operator for actuating said last-named operating means.

15. A traction engine comprising a frame, a pair of traction wheels supporting said frame, engine and transmission elements on the frame for driving the traction wheels, a drawbar frame extending below the first-named frame, a tubular king bolt fast on the draw bar frame and extending below the same and into a socket on the first-named frame for pivotally connecting said frames to oscillate relatively about a vertical axis, an operator's seat on the rear end of said drawbar frame, a plurality of sleeves vertically slidable in said king bolt and having connections for operating the engine and transmission elements, levers on the drawbar frame having connection with said sleeves, and means on the drawbar frame extending from said levers into proximity with said operator's seat for actuating the levers and sliding the sleeves.

16. A traction engine comprising a frame, a pair of traction wheels supporting said frame, a vertical king bolt, a drawbar frame extending below said first-named frame and suspended by said king bolt, said drawbar frame extending forward of the king bolt to a point near the front end of the first-named frame, an operator's seat on the rear end of the drawbar frame, and means operable therefrom including a gear on the front end of the drawbar frame and a rack on the front end of the first-named frame for oscillating the two frames relatively to steer the traction engine.

17. A traction engine comprising a frame, a pair of traction wheels supporting said frame, engine and transmission elements on the frame for driving the traction wheels, a tubular king bolt, a drawbar frame rigidly connected with said king bolt and suspended beneath the first-named frame by said king bolt so that the two frames are relatively movable about a vertical axis, said drawbar frame extending forward of the king bolt to a point beneath the forward portion of the first-named frame, an operator's seat on the rear end of said drawbar frame, means controlled by the operator from said seat and in part extending through said king bolt for operating the engine and transmission elements, and means controlled by the operator from said seat and coacting at the forward portions of said frames for oscillating the two frames relatively to steer the traction engine.

18. A traction engine comprising a frame having side members of channel iron, pieces formed with blocks extending into the spaces between the flanges of each of said side members, said side members being slotted, bolts extending through said slots and into said blocks for adjustably securing the pieces to the side members, an axle rigidly held by said pieces so as to have portions extending outside the limits of the frame, and traction wheels having their hubs journaled upon the outwardly extending portions of the axle.

19. A traction engine comprising a frame having side members of channel iron, pieces formed with blocks extending into the spaces between the flanges of each of said side members, said side members being slotted, bolts extending through said slots and into said blocks for adjustably securing the pieces to the side members, an axle rigidly held by said pieces so as to have portions extending outside the limits of the frame, traction wheels having their hubs journaled upon the outwardly-extending portions of the axle, and oppositely-disposed set-screws for adjusting said axle bodily and transversely along said frame.

20. A traction engine comprising a frame having side members of channel iron, pieces formed with blocks extending into the spaces between the flanges of each of said side members, said side members being slotted, bolts extending through said slots and into said blocks for adjustably securing the pieces to the side members, an axle rigidly held by said pieces so as to have portions extending outside the limits of the frame, traction wheels having their hubs journaled upon the outwardly-extending portions of the axle, a disk fast on said pieces having a peripheral flange, a drive gear on the hub outside of said disk, and a dust-proof casing for said drive gear supported upon said flanged disk.

21. A traction engine comprising a frame having side members of channel iron, pieces formed with blocks extending into the spaces between the flanges of each of said side members, said side members being slotted, bolts extending through said slots and into said blocks for adjustably securing the pieces to the side members, an axle rigidly held by said pieces so as to have portions extending outside the limits of the frame, traction wheels having their hubs journaled upon the outwardly-extending portions of the axle, a disk fast on said pieces having a peripheral flange, a drive gear on the hub outside of said disk, a dust-proof casing for said drive gear supported upon said flanged disk, and set-screws for adjusting said pieces and the parts carried thereby along said side members.

22. A traction engine comprising a frame having longitudinal side members, pieces adjustably secured to said side members, an axle rigidly connected in said pieces and having portions extending outside of the same, traction wheels having their hubs journaled upon said outwardly-extended portions of the axle, a drive gear fast on each hub, driving pinions meshing with the drive gears, dust-proof casings for said gearing rigidly secured to said pieces, and means for adjusting the pieces and the parts carried thereby along said side members.

23. A traction engine comprising a frame, a pair of traction wheels supporting said frame, an engine and transmission elements on said frame, a drawbar pivoted to said frame, substantially below the axis of said wheels, said drawbar extending forward to the end of said frame and rearward past the same, a steering device situated at the forward portion of said drawbar and frame for oscillating the same relative to each other, and means situated at the rear of said frame for guiding and restricting the movement of said frame and drawbar to a horizontal plane.

24. A traction engine comprising a frame, a pair of traction wheels for supporting the frame, engine and transmission elements mounted on said frame, a drawbar pivotally connected to said frame and extending forward and rearward of its point of pivot to said frame, an arcuate guideway on said frame having its center at the point of pivot of said drawbar, a member on said drawbar engaging said guideway for holding the frame and drawbar in position, and steering means at the other end of said frame and drawbar for oscillating the frame and drawbar relative to each other.

25. A traction engine comprising a frame, a pair of traction wheels for supporting the frame, engine and transmission elements on said frame, an arcuate channel member secured to one end of said frame, a drawbar pivoted to said frame in line with the center of said arcuate member, a tapered roller pivoted to said drawbar and adapted to roll between the flanges of said channel member, and means to oscillate said drawbar for steering.

In testimony whereof I affix my signature in presence of two witnesses.

MARTIN H. LANG.

Witnesses:
F. A. WHITELEY,
H. A. BOWMAN.